United States Patent
Wang et al.

(10) Patent No.: US 8,587,657 B2
(45) Date of Patent: *Nov. 19, 2013

(54) DETERMINING A NUMBER OF OBJECTS IN AN IR IMAGE

(75) Inventors: Yao Rong Wang, Webster, NY (US); Zhigang Fan, Webster, NY (US); Lalit Keshav Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 288 days.

This patent is subject to a terminal disclaimer.

(21) Appl. No.: 13/086,006

(22) Filed: Apr. 13, 2011

(65) Prior Publication Data

US 2012/0262577 A1 Oct. 18, 2012

(51) Int. Cl.
*H04N 7/18* (2006.01)
*H04N 5/33* (2006.01)
*G06K 9/00* (2006.01)

(52) U.S. Cl.
USPC .......................... 348/148; 348/164; 382/118

(58) Field of Classification Search
USPC ................................. 348/164, 148; 382/118
See application file for complete search history.

(56) References Cited

U.S. PATENT DOCUMENTS

| | | | |
|---|---|---|---|
| 7,835,554 B2 | 11/2010 | Rowe | |
| 7,899,217 B2 | 3/2011 | Uludag et al. | |
| 2005/0063565 A1* | 3/2005 | Nagaoka et al. | 382/104 |
| 2006/0020212 A1 | 1/2006 | Xu et al. | |
| 2006/0104488 A1* | 5/2006 | Bazakos et al. | 382/118 |
| 2006/0122515 A1 | 6/2006 | Zeman et al. | |
| 2010/0003044 A1 | 1/2010 | Burry et al. | |
| 2010/0061598 A1 | 3/2010 | Seo | |

OTHER PUBLICATIONS

Paquit, Vincent C., "3D and Multispectral Imaging for Subcutaneous Veins Detection", Optical Society of America, Jul. 6, 2009, vol. 17, No. 14/Optics Express 11362.
Wang, Yao Rong, "Determining a Total Number of People in an IR Image Obtained Via an Ir Imaging System", U.S. Appl. No. 12/967,775, filed Dec. 14, 2010.

* cited by examiner

*Primary Examiner* — David Czekaj
*Assistant Examiner* — Tsion B Owens
(74) *Attorney, Agent, or Firm* — Philip E. Blair; Fleit Gibbons Gutman Bongini & Bianco P.L.

(57) ABSTRACT

What is disclosed is a novel system and method for determining the number of objects in an IR image obtained using an IR imaging system. In one embodiment, a total of N intensity values are collected for each pixel in an IR image using a IR imaging system comprising an IR detection device and an IR Illuminator. Intensity values are retrieved from a database which have been estimated for a plurality of known materials, such as skin and hair. A classification is determined for each pixel in the IR image using either a best fitting method of a reflectance, or a correlation method. Upon classification, a total number of objects in the IR image can be determined. The present system and method finds its intended uses in of real world applications such as, determining the number of occupants in a vehicle traveling in a HOV/HOT lane.

24 Claims, 14 Drawing Sheets

|  | CLEAN GLASS | | | | |
| --- | --- | --- | --- | --- | --- |
|  | C123 | C124 | C134 | C234 | C4 |
| LIGHT SKIN TO COTTON | 0.842 | -0.973 | -0.857 | -0.727 | -0.760 |
| LIGHT SKIN TO WOOL | 0.849 | -0.972 | -0.829 | -0.687 | -0.726 |
| LIGHT SKIN TO POLYAMIDE | 0.779 | -0.984 | -0.777 | -0.652 | -0.695 |
| DARK SKIN TO COTTON | 0.987 | -0.957 | -0.425 | -0.551 | -0.370 |
| DARK SKIN TO WOOL | 0.982 | -0.959 | -0.377 | -0.503 | -0.324 |
| DARK SKIN TO POLYAMIDE | 0.997 | -0.941 | -0.296 | -0.463 | -0.259 |
|  | | | | | |
|  | DIRTY GLASS | | | | |
|  | C123 | C124 | C134 | C234 | C4 |
| LIGHT SKIN TO COTTON | -0.655 | -0.992 | -0.996 | -0.978 | -0.982 |
| LIGHT SKIN TO WOOL | -0.638 | -0.992 | -0.993 | -0.970 | -0.976 |
| LIGHT SKIN TO POLYAMIDE | -0.854 | -1.000 | -0.983 | -0.976 | -0.980 |
| DARK SKIN TO COTTON | 0.889 | -0.968 | -0.802 | -0.918 | -0.823 |
| DARK SKIN TO WOOL | 0.889 | -0.969 | -0.783 | -0.903 | -0.806 |
| DARK SKIN TO POLYAMIDE | 0.990 | -0.938 | -0.739 | -0.914 | -0.768 |
|  | | | | | |
|  | TINTED GLASS | | | | |
|  | C123 | C124 | C134 | C234 | C4 |
| LIGHT SKIN TO COTTON | 0.191 | -0.971 | -0.993 | -0.933 | -0.945 |
| LIGHT SKIN TO WOOL | 0.206 | -0.970 | -0.991 | -0.927 | -0.940 |
| LIGHT SKIN TO POLYAMIDE | -0.004 | -0.980 | -0.987 | -0.933 | -0.948 |
| DARK SKIN TO COTTON | 0.955 | -0.652 | -0.407 | -0.705 | -0.396 |
| DARK SKIN TO WOOL | 0.950 | -0.653 | -0.393 | -0.692 | -0.383 |
| DARK SKIN TO POLYAMIDE | 0.994 | -0.618 | -0.367 | -0.703 | -0.362 |

FIG. 13

| | CLEAN GLASS | | | | |
|---|---|---|---|---|---|
| | C123 | C124 | C134 | C234 | C4 |
| LIGHT SKIN TO COTTON | 0.895 | -0.974 | -0.807 | -0.675 | -0.699 |
| LIGHT SKIN TO WOOL | 0.899 | -0.974 | -0.775 | -0.633 | -0.663 |
| LIGHT SKIN TO POLYAMIDE | 0.837 | -0.986 | -0.717 | -0.598 | -0.628 |
| DARK SKIN TO COTTON | 0.984 | -0.863 | -0.284 | -0.459 | -0.222 |
| DARK SKIN TO WOOL | 0.983 | -0.865 | -0.234 | -0.409 | -0.175 |
| DARK SKIN TO POLYAMIDE | 0.998 | -0.831 | -0.148 | -0.368 | -0.105 |
| | DIRTY GLASS | | | | |
| | C123 | C124 | C134 | C234 | C4 |
| LIGHT SKIN TO COTTON | 0.964 | -0.403 | -0.259 | -0.168 | -0.034 |
| LIGHT SKIN TO WOOL | 0.966 | -0.405 | -0.219 | -0.129 | 0.004 |
| LIGHT SKIN TO POLYAMIDE | 0.935 | -0.453 | -0.143 | -0.087 | 0.053 |
| DARK SKIN TO COTTON | 0.989 | 0.939 | 0.600 | 0.467 | 0.652 |
| DARK SKIN TO WOOL | 0.988 | 0.940 | 0.632 | 0.502 | 0.680 |
| DARK SKIN TO POLYAMIDE | 0.999 | 0.956 | 0.691 | 0.538 | 0.729 |
| | TINTED GLASS | | | | |
| | C123 | C124 | C134 | C234 | C4 |
| LIGHT SKIN TO COTTON | 0.879 | -0.948 | -0.831 | -0.678 | -0.685 |
| LIGHT SKIN TO WOOL | 0.882 | -0.948 | -0.816 | -0.659 | -0.667 |
| LIGHT SKIN TO POLYAMIDE | 0.806 | -0.962 | -0.772 | -0.636 | -0.639 |
| DARK SKIN TO COTTON | 0.979 | 0.722 | 0.142 | -0.159 | 0.208 |
| DARK SKIN TO WOOL | 0.978 | 0.722 | 0.167 | -0.134 | 0.232 |
| DARK SKIN TO POLYAMIDE | 0.998 | 0.755 | 0.238 | -0.104 | 0.293 |

FIG. 14

|  | CLEAN GLASS | | | | |
| --- | --- | --- | --- | --- | --- |
|  | C123 | C124 | C134 | C234 | C4 |
| LIGHT SKIN TO COTTON | 0.918 | -0.943 | -0.753 | -0.624 | -0.627 |
| LIGHT SKIN TO WOOL | 0.966 | -0.997 | -0.769 | -0.753 | -0.739 |
| LIGHT SKIN TO POLYAMIDE | 0.542 | -0.887 | -0.790 | -0.487 | -0.605 |
| DARK SKIN TO COTTON | 0.981 | -0.987 | -0.477 | -0.425 | -0.327 |
| DARK SKIN TO WOOL | 0.985 | -0.811 | -0.278 | -0.404 | -0.199 |
| DARK SKIN TO POLYAMIDE | 0.901 | -0.939 | -0.480 | -0.646 | -0.489 |

|  | DIRTY GLASS | | | | |
| --- | --- | --- | --- | --- | --- |
|  | C123 | C124 | C134 | C234 | C4 |
| LIGHT SKIN TO COTTON | -0.917 | -0.982 | -0.996 | -0.999 | -0.990 |
| LIGHT SKIN TO WOOL | -0.433 | -0.996 | -0.973 | -0.975 | -0.972 |
| LIGHT SKIN TO POLYAMIDE | -0.142 | -0.998 | -0.949 | -0.926 | -0.939 |
| DARK SKIN TO COTTON | 0.601 | -0.996 | -0.912 | -0.875 | -0.886 |
| DARK SKIN TO WOOL | 0.899 | -0.999 | -0.879 | -0.861 | -0.853 |
| DARK SKIN TO POLYAMIDE | 0.908 | -0.993 | -0.791 | -0.850 | -0.788 |

|  | TINTED GLASS | | | | |
| --- | --- | --- | --- | --- | --- |
|  | C123 | C124 | C134 | C234 | C4 |
| LIGHT SKIN TO COTTON | 0.391 | -0.885 | -0.988 | -0.807 | -0.853 |
| LIGHT SKIN TO WOOL | -0.016 | -0.759 | -0.946 | -0.649 | -0.695 |
| LIGHT SKIN TO POLYAMIDE | 0.379 | -0.938 | -0.953 | -0.820 | -0.856 |
| DARK SKIN TO COTTON | 0.869 | -0.770 | -0.514 | -0.773 | -0.515 |
| DARK SKIN TO WOOL | 0.991 | 0.817 | -0.228 | -0.178 | -0.016 |
| DARK SKIN TO POLYAMIDE | 0.894 | -0.068 | -0.087 | -0.588 | -0.140 |

DETERMINING A NUMBER OF OBJECTS IN AN IR IMAGE

CROSS REFERENCE TO RELATED APPLICATIONS

This application is related to commonly assigned and co-pending U.S. patent application: "Determining A Total Number Of People In An IR Image Obtained Via An IR Imaging System", U.S. Ser. No. 12/967,775, which is incorporated herein in it's entirety by reference.

TECHNICAL FIELD

The present invention is directed to systems and methods which use an infrared camera system to obtain a multiband IR image and then determine the total number of objects in that IR image.

BACKGROUND

There are many commercial face recognition systems (FRS) available in commerce. However, many of these systems require face positioning in front of a camera and good illumination. Such conditions are often not available where face recognition may be needed or desired. In many practical situations, the subject being sought for detection and recognition may be moving while passing in front of an infrared camera such as, for instance, while traveling in a car. Further, the illumination of the subject may be inadequate. This art needs methods for determining a number of objects in an image captured using an infrared camera.

What are needed in this art are systems and methods for determining the number of objects in an IR image obtained using an IR imaging system.

BRIEF SUMMARY

What is disclosed is a novel system and method for determining the number of objects in an IR image. The present system and method provides a means for separating objects from the surrounding background. Such a system finds its intended uses in a wide array of real world applications such as, for instance, determining the number of occupants in a vehicle traveling in a HOV/HOT lane, or in an image captured by a security camera.

In one example embodiment, the present system and method involves the following. First, using an IR imaging system, a total of N intensity values are collected for each pixel in an IR image. Once the intensity values have been collected, each pixel in the IR image is processed such that a classification can be determined for that pixel. In one embodiment, intensity values are calculated using reflectances which have been estimated for a plurality of known materials such as, for example, hair and skin. Pixel intensities are then compared with the calculated intensity values and the pixels are classified based upon a best fitting reflectance. In another embodiment, a correlation coefficient is calculated between each pixel's intensity value and the retrieved intensity values. The pixels are then classified based upon an amount of correlation therebetween. Once the pixels have been classified, the total number of objects in the IR image can be determined based upon the pixel classifications.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which:

FIG. 13 shows correlation coefficients for a 3-band and a 4-band system with $\eta=0$;

FIG. 14 shows correlation coefficients for a 3-band and a 4-band system with $\eta=0.05$;

FIG. 15 is a table of correlation coefficients for a 3-band and a 4-band system with $\eta=0$ and 20% white noise;

DETAILED DESCRIPTION

What is disclosed is a novel system and method for determining the number of objects in an IR image obtained using an IR imaging system. The present method separates a living object from the surrounding background via two embodiments, one which utilizes a set of correlation coefficients and another which utilizes a set of best fitting reflectances. Quantities derived therefrom are used to selectively classify pixels in the image. Based upon the classification, the number of objects in the image can be determined.

NON-LIMITING DEFINITIONS

Figure 1:
FIG. 1 shows an example IR image.

A "pixel" is the smallest addressable element in an image. Each pixel has its own address. Pixels are normally arranged in a grid. The intensity of each pixel is variable and depends on the characteristics and sensitivity of the sensing device being used to measure that pixel. The resolution for a camera is effectively the size of the pixel. Smaller pixels mean more of them will go into the image, giving it better definition An "IR Image" is an image obtained from an IR detection device having detected IR light reflected from an illuminated sample. A fully-populated IR image consists of pixels with each having an intensity value at each desired spectral band of interest. FIG. 1 shows an example IR image captured using an IR camera. Infrared (IR) light is electromagnetic radiation with a wavelength between 0.7 and 300 micrometers. It is to be noted that the upper end wavelength for IR range is not precisely set. This equates to a frequency range between 1 and 430 THz. IR wavelengths are longer than the wavelength of visible light, but shorter than the microwave. Bright sunlight provides an irradiance of approximately 1 kilowatt per square meter at sea level. Of this energy, 527 watts is infrared, 445 watts is visible light, and 32 watts is ultraviolet. In active infrared, the camera illuminates the scene at infrared wavelengths invisible to the human eye. Infrared energy is just one part of the electromagnetic spectrum that encompasses radiation from gamma rays, x-rays, ultra violet, a thin region of visible light, infrared, terahertz waves, microwaves, and radio waves. These are all related and differentiated in the length of their wavelength. Various embodiments hereof utilize the entire lower reflective infrared (LRIR) band (i.e., ≈800-1400 nanometers). LRIR may be detected with a multi-band imaging (MBI) device sensitive to that frequency band and provide images that resemble a black and white picture. The upper reflective infrared (URIR) band (i.e., ≈1400-2200 nanometers). A URIR sensed image is not like LRIR sensed images in that human flesh does not reflect IR in the same manner as inanimate objects. Since the lower and upper IR bands are reflective, the scene may need a source of illumination. Such illumination need not be visible and so will not be a distraction to human beings. In the daytime, the LRIR and URIR illumination may be unnecessary because sufficient IR illumination may be provided by ordinary sunlight.

An "IR illuminator" is a light source. Light levels may be controlled by varying the drive currents. For example, the optical output of LEDs varies linearly with current. LED arrays capable of IR illumination both in time-sequential fashion or simultaneously, are well known. One example IR illumination system is shown in FIG. 2.

Figure 3:
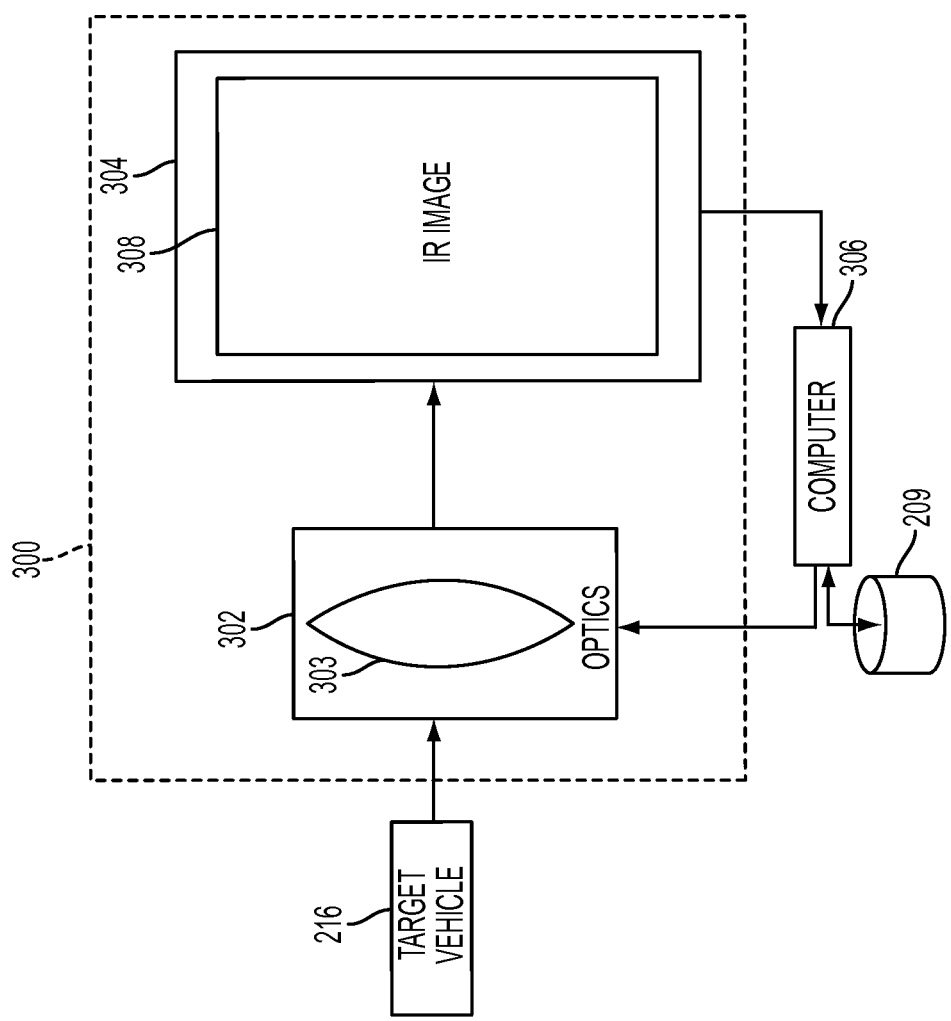
FIG. 3 illustrates one embodiment of an example IR detection system.

An "IR Imaging System" is an apparatus designed to capture IR light reflected from a target object, separate it into its component wavelengths, and output an IR image of the target. Such systems have an IR detector (such as an IR camera) and an IR Illuminator. One example IR detection system is shown in FIG. 3. An IR imaging system can be either a single IR detection device and a sequentially illuminated N-band illuminator (N≥3) with one fixed filter, or comprise a total of N detection devices (N≥3) each having a respective band pass filter, and a single illumination source.

Example Illumination System

Figure 2:
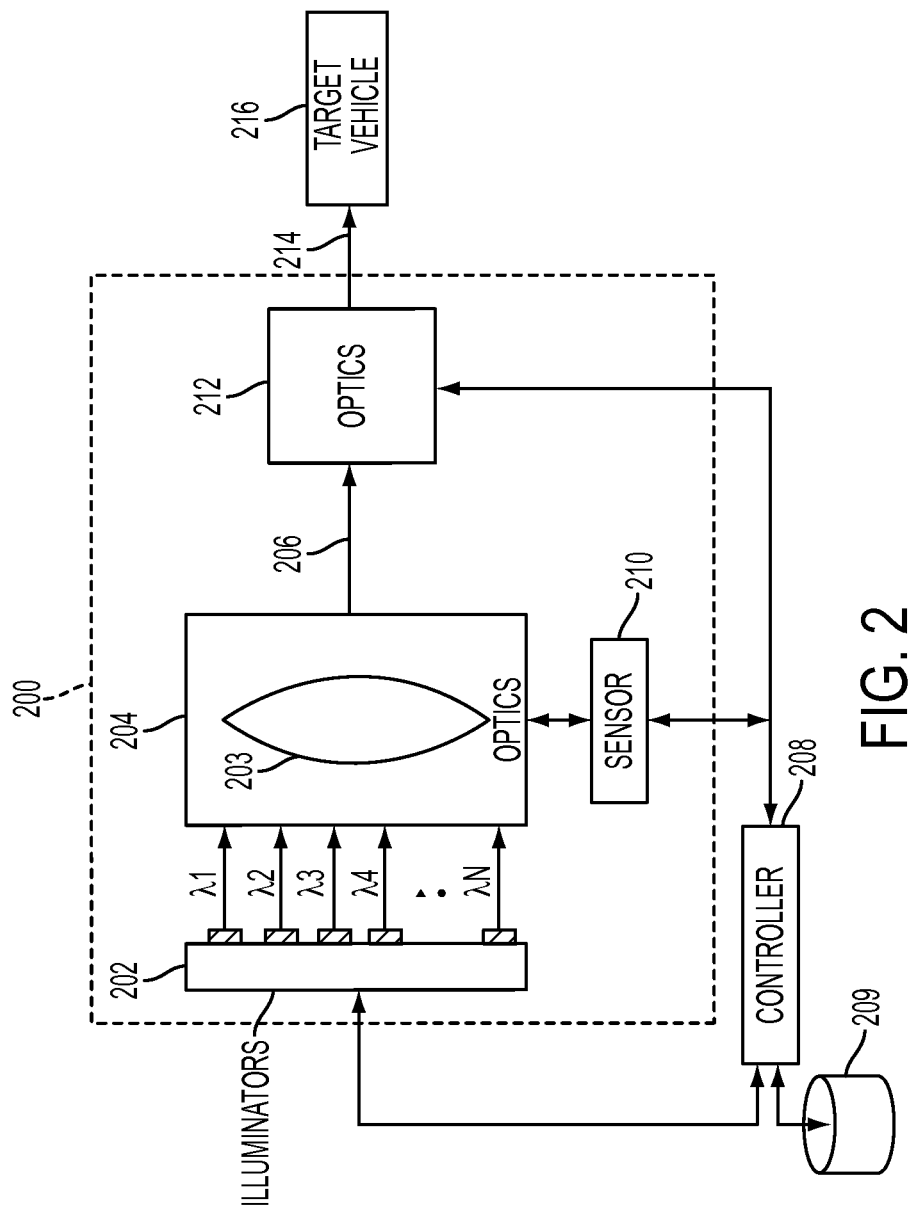
FIG. 2 illustrates one embodiment of an example IR illumination system.

Reference is now being made to FIG. 2 which illustrates one embodiment of an example IR illumination system for use in accordance with the teachings hereof.

The IR illumination system 200 of FIG. 2 is shown comprising an IR light source array 202 having a plurality of IR light sources each emitting a narrow band of IR radiation at a respective peak wavelength (shown as $\lambda_1, \ldots, \lambda_n$). Source array 202 comprises an array of light emitting diodes (LEDs). Each diode is selected to emit IR radiation at a particular wavelength band and defines a source in the array for that wavelength band. Controller 208 is coupled to IR source array 202 and controls the input current to each illuminator and thereby, the intensity output of each. Sensing optics 204 has one or more optics 203 which combine the wavelengths to produce IR illumination beam 206. Sensor 210 samples the radiation emitted from the IR light source array and provides feedback to controller 208. Focusing Optics 212 receives beam 206 and focuses output beam 214 onto target vehicle 216. Optics 212 includes a plurality of lens of varying focal lengths positioned in the beam path to focus the beam. Controller 208 is also coupled to optics 212 to effectuate changes in output beam 214 due to target size, target distance, target speed, to name a few constraints. Controller 208 is further in communication with storage device 209 to store/retrieve calibration information, intensity levels, and the like, including data and machine readable program instructions. Controller 208 may comprise a computer system such as a desktop, server, mainframe, and the like. Controller 208 may be placed in wired or wireless communication with such a computing device over a network (not shown). Such a network may be a local area network (LAN) or the Internet. It should be appreciated that any of the components of illumination system 200 may be placed in communication with such a computing system to further facilitate the intended purposes hereof.

Any of the optics described above with respect to FIG. 2, can be replaced with an optical system having optical power and may further include mirrors. Such an optical system may include multiple components each having optical power, e.g., it may be doublet or a triple lens. In the limit that such optical system defines a unique focal length F, the source array and grating would be positioned in the front and back focal planes of the optics. As a result, the optical system images the grating at infinity with respect to each element of the light source array, and thus each source element sees the same region of the grating. The light from each element would be coextensive on that region. The grating can then produce output radiation whose spectral content is substantially uniform across its transverse profile by compensating for the dispersion associated with lateral position of the different wavelength band sources. This allows the spectral content of output beam 214 to be substantially uniform across its transverse profile. In practice, it may be difficult to precisely define a desired focal length for the optical system because of aberrations (e.g., field curvature, axial chromatic, lateral chromatic, distortion, coma, and the like), which may cause the optics to focus rays to slightly different positions according to their wavelength or their lateral positioning.

In addition, the relative positions of the optical system, the source array, and the grating, are selected according to the more general condition that the optical system images the grating at infinity with respect to each source element of the light source array, at least for paraxial rays that emerge from each source. For a ray propagating at an angle θ to the optical axis, a paraxial ray has $\sin(\theta) \approx \theta$. This infinity condition can be achieved by positioning each source element at a nominal back focal plane of the optical system to within the depth of field of the optical system, and positioning the grating at nominal front focal plane of the optical system to within the depth of field of the optical system. The depth of field (DOV) is related to the numerical aperture (NA) of the optical system according to: $DOV = \lambda/NA^2$, where $\lambda$ is the wavelength of the light from the source element. The optics may be designed with components to provide multiple degrees of freedom to compensate for various optical aberrations. Although additional components in the optical system provide additional degrees of freedom for reducing aberrations, each additional component also adds cost and complexity to the optical system.

Example IR Detection System

Reference is now being made to FIG. 3 which illustrates one embodiment of an example IR detection system 300 for use in accordance with the teachings hereof. In FIG. 3, target vehicle 216 reflects the IR light of beam 214 being emitted by optics 212 of FIG. 2. A portion of the reflected IR light is received by optics 302 having one or more lens 303 that focus the received light onto sensor 304 which spatially resolves the received light to obtain IR image 308. The optics 302 may also include one or more band pass filters that only allow light in a narrow band of wavelength to pass though. The filters may also be sequentially changed to get N intensities at 308. Sensor 304 sends the IR image information to computer 306 for processing and storage. Image detector 308 is a multispectral image detection device whose spectral content may be selectable through a controller (not shown). Suitable optics for source optics 302 and detector 304 include those commonly found in the arts. Detector 304 independently records light intensity at multiple pixels locations along a two dimensional grid. Suitable sensors include charge-coupled device (CCD) detectors, complementary metal oxide semiconductors (CMOS) detectors, charge-injection device (CID) detectors, vidicon detectors, reticon detectors, image-intensifier tube detectors, pixelated photomultiplier tube (PMT) detectors, Indium Gallium Arsenide (InGaAs), Mercury Cadmium Telluride (MCT), and Microbolometer. It is to be noted that the silicon based detectors are limited to below 1100 nm. Systems with hybrid detectors (i.e., combinations of silicon based and non-silicon based) are not out-of-reach. Computer 306 is in communication with optics 302 to control the lens thereof, and with detector 304 to control the sensitivity thereof. Computer 306 receives the sensitivity values associated with each pixel of IR image 308. Computer 306 further includes a keyboard, monitor, printer, etc. (not shown) as is necessary to effectuate the control of system 300.

Example IR Imaging System

Figure 4:
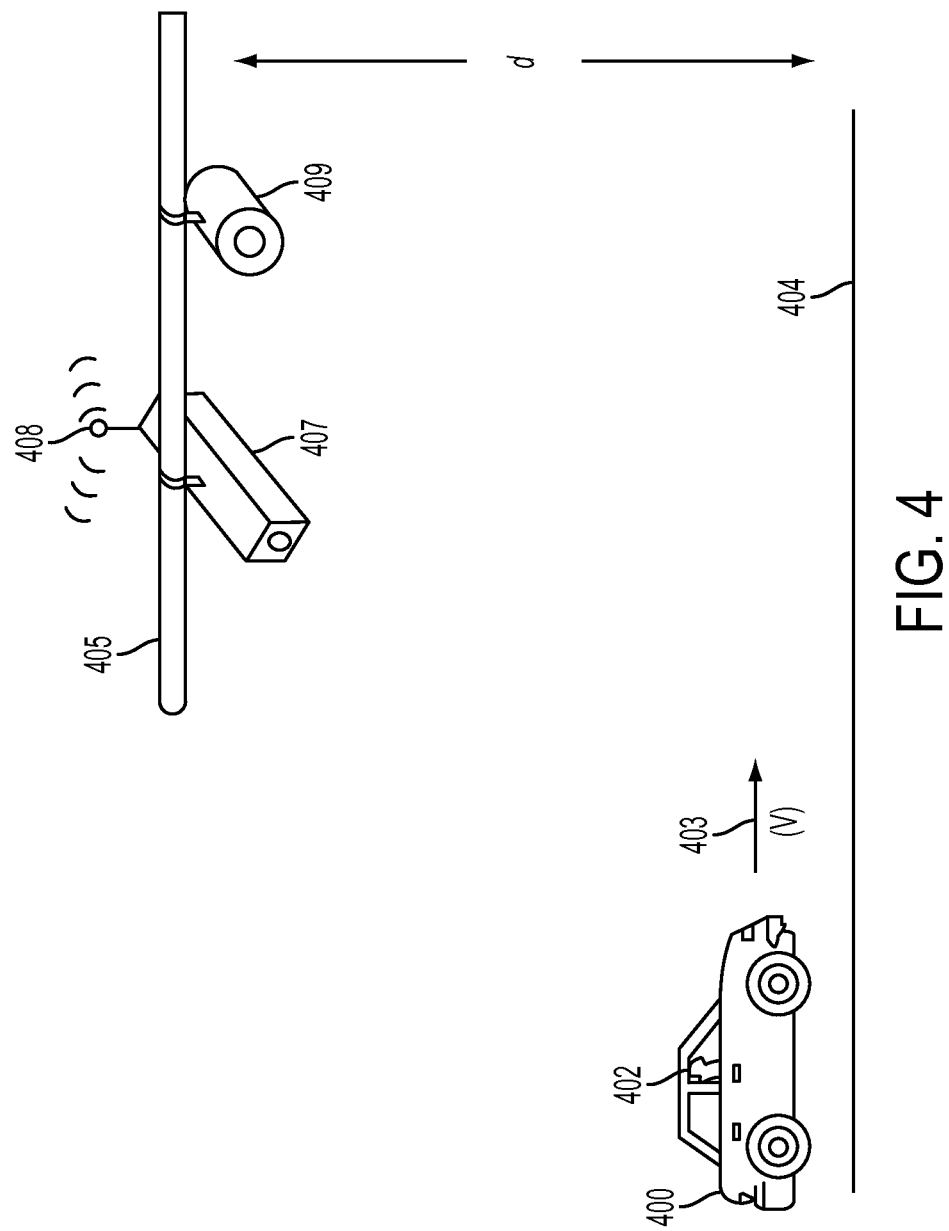
FIG. 4 shows an example vehicle occupancy detection system incorporating the IR illumination system of FIG. 2 and the IR detection system of FIG. 3.

Reference is now being made to FIG. 4 which shows an example vehicle occupancy detection system which incorporates the IR illumination system of FIG. 2 and the IR detection system of FIG. 3.

In FIG. 4, target vehicle 400 contains a human occupant 402 traveling at velocity v in a direction of motion indicated by directional vector 403 along HOV lane 404. Positioned within a desired distance d above lane 404 is support arm 405 comprising a tubular construction similar to that used for traffic lights. Fixed onto arm 405 are IR detection system 407 having a transmission element 408 for communication with a remote device, and IR illumination system 409. System 409 and 407 are intended to represent embodiments of the systems of FIGS. 2 and 3, respectively. Detection device 407 may comprise a camera equipped with a telephoto lens, a band-pass filter, and a polarizing lens to reduce a glare effect. During daytime operation, illumination by the sun may be sufficient. IR illuminator 409 emits IR radiation at one or more wavelengths which are reflected back to detector 207 from the target vehicle and the contents therein. IR detection system 407 transmits the IR image and/or intensity values associated with each pixel in the IR image to a computing device for further processing in a manner which will be next described.

Example Flow Diagram

Figure 5:
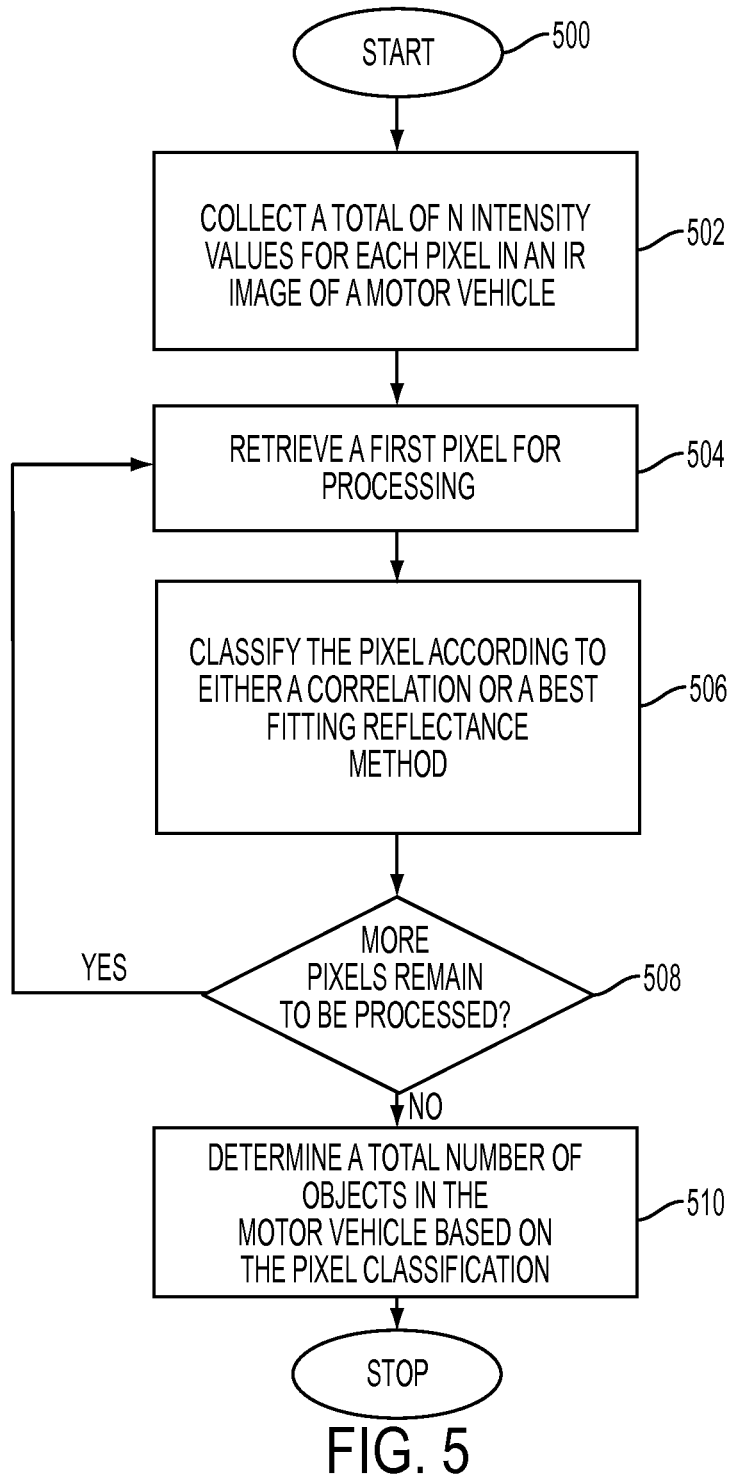
FIG. 5 illustrates one example embodiment of the present method directed towards an embodiment for determining the number of occupants in a motor vehicle.
Figure 6:
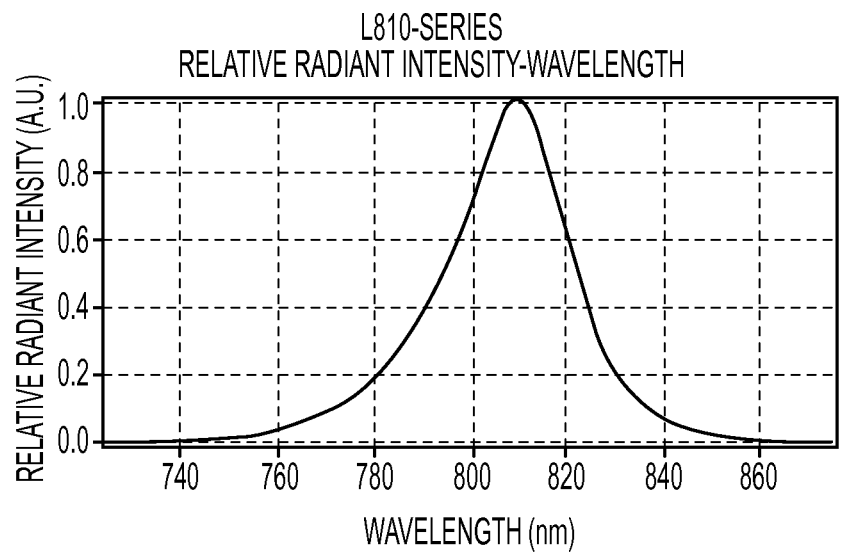
FIGS. 6-12 show relative radiant intensity of IR LEDs suitable for use with various embodiments hereof.
Figure 7:
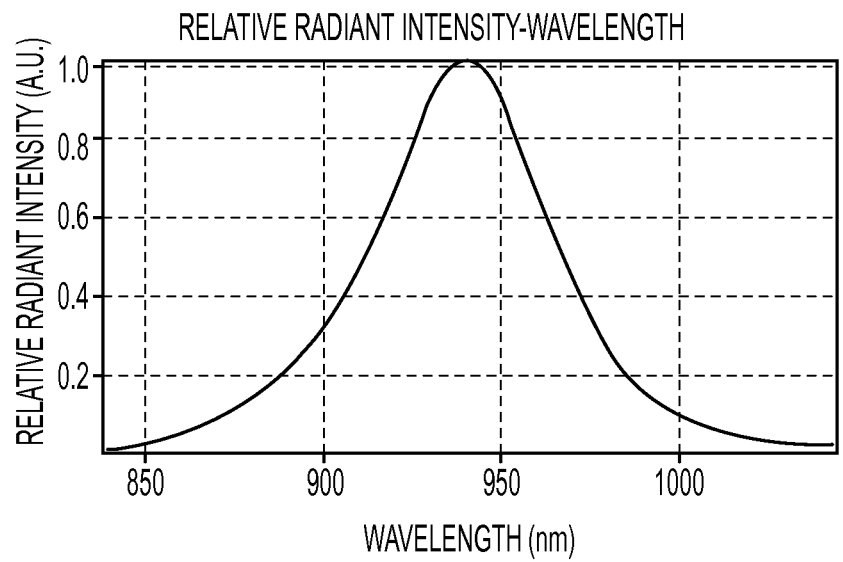
Figure 8:
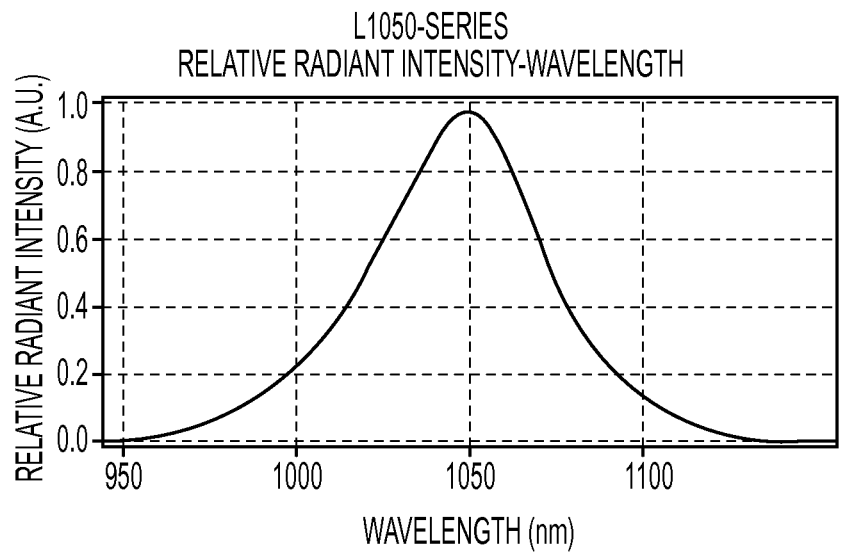
Figure 9:
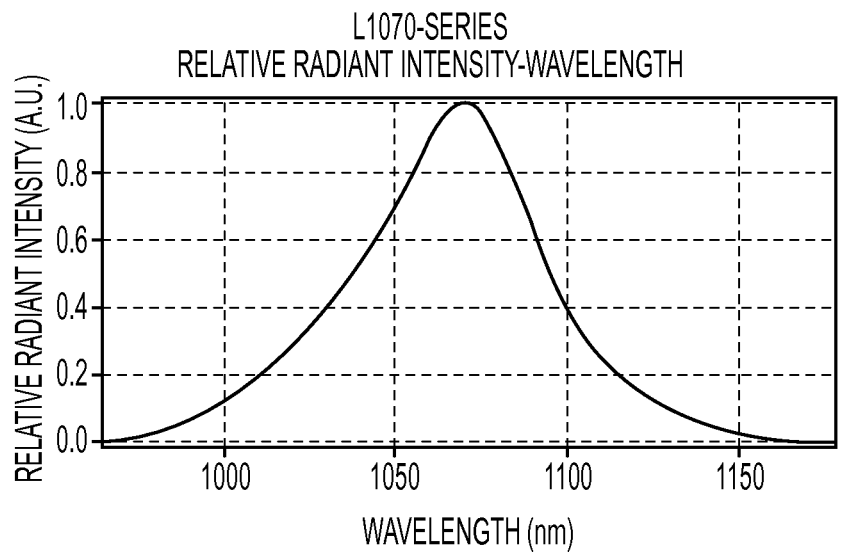
Figure 10:
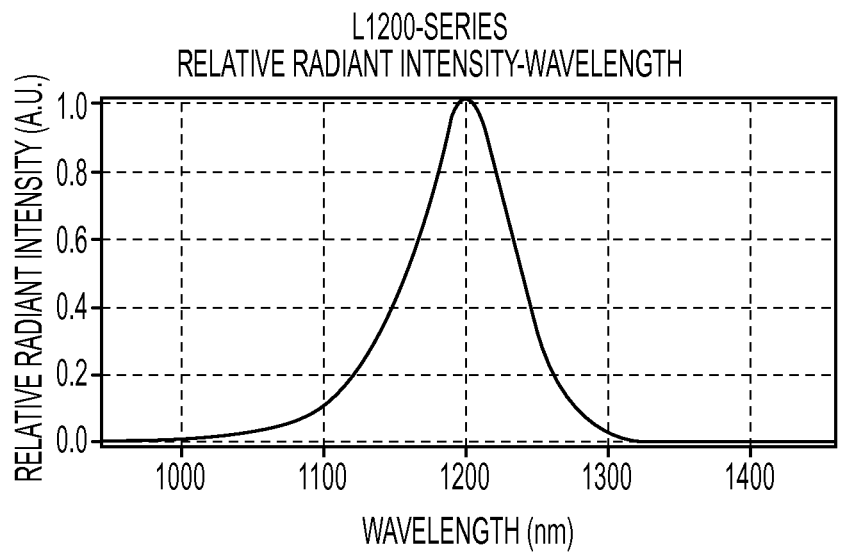
Figure 11:
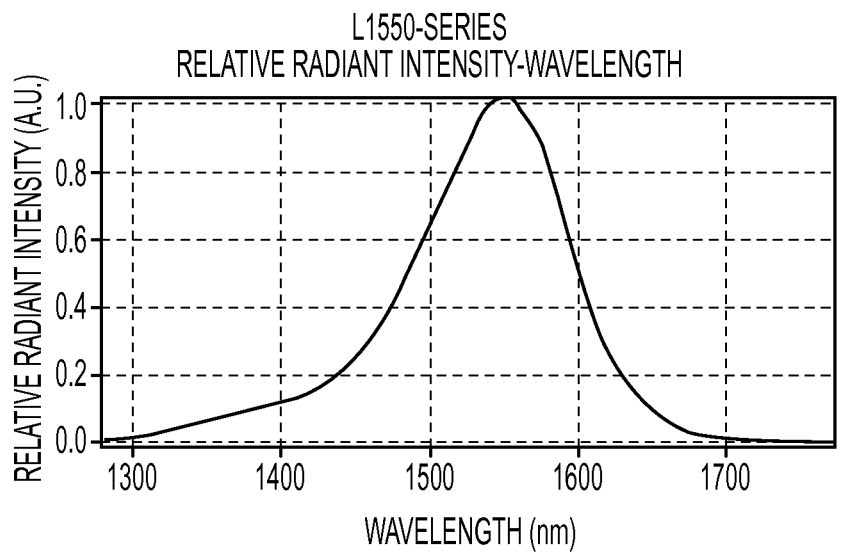
Figure 12:
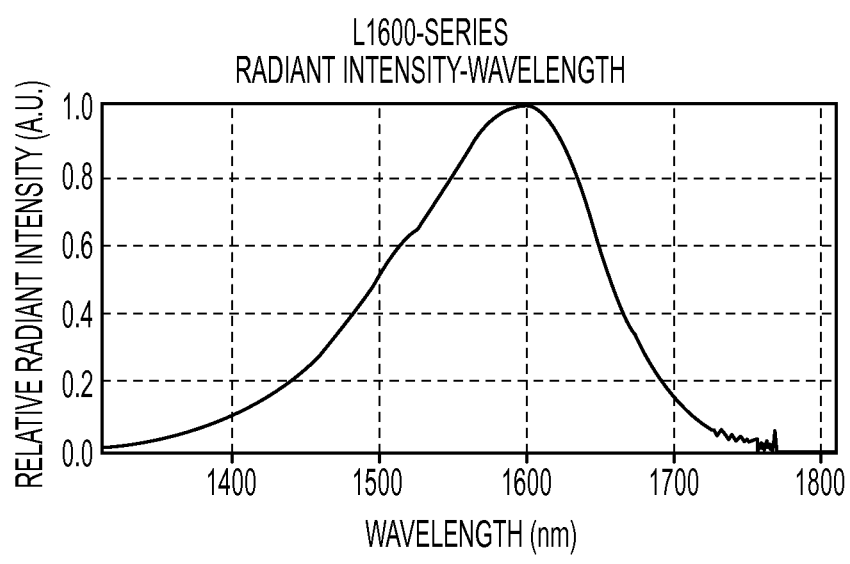

Reference is now being made to the flow diagram of FIG. 5 which illustrates one example embodiment of the present method for determining the number of objects in a motor vehicle. It should be appreciated that, although this embodiment is discussed in the context of a transportation management system, the teachings hereof are intended to find their uses in a wide array of systems wherein determining a number of objects in an IR image obtained using an IR imaging system is desired. Such embodiments are intended to fall within the scope of the appended claims. Flow processing starts at 500 and immediately proceeds to step 502.

At step 502, a total of N intensity values are collected for each pixel in an IR image. The intensity values for each pixel are collected from the reflected IR light source using the example IR imaging system of FIGS. 2-4. The IR image and/or the intensity values for each pixel can be provided to a computer workstation or special purpose computer system for further processing in accordance with the various embodiments hereof. In the following, it is assumed that the IR attenuation in the air and the integration time to be the same for all bands. If not, these factors should be adjusted accordingly.

If the IR detection device is a single IR detection device, and the IR Illuminator is a sequentially illuminating N-band illuminator (N≥3) with one fixed filter, the intensity value comprises:

$$I_c(i) = \alpha \int_{\lambda_1}^{\lambda_2} I_s^i(\lambda)[T_G^2(\lambda)R_o(\lambda) + \eta R_G(\lambda)]T_L(\lambda)D(\lambda)d\lambda + I_b, \quad (1)$$

where i=1 ... N, such that i is the $i^{th}$ IR band from the illuminator that is sequentially illuminating, α is a constant that depends on an angle and distance from the illumination source, an attenuation of an IR wave in the air, and an integration time of the detecting device, $I_b$ is an intensity from a background light source such as that from the IR component of sunlight, $R_o(\lambda)$ is a reflectance of an object inside the vehicle, $R_G(\lambda)$ and $T_G(\lambda)$ are a reflectance and a transmittance of glass, constant η is a measure of the percentage of light from the illuminator reflected from vehicle glass and received by the detector, $T_L(\lambda)$ is a transmittance of the fixed filter, and $D(\lambda)$ is a responsivity of the detection device.

If the IR detection device is N detection devices having N band pass filters (N≥3), and the IR Illuminator has one illuminator covering a wavelength range of the filters, the intensity value comprises:

$$I_c(i) = \alpha \int_{\lambda_1}^{\lambda_2} I_s(\lambda)[T_G^2(\lambda)R_o(\lambda) + \eta R_G(\lambda)]T_L^i(\lambda)D(\lambda)d\lambda + I_b, \quad (2)$$

where i=1 ... N, such that i is the $i^{th}$ IR band pass filter, α is a constant that depends on an angle and distance from the illumination source, an attenuation of an IR wave in the air, and an integration time of the detecting device, $I_b$ is a background intensity, $R_o(\lambda)$ is a reflectance of an object inside the vehicle, $R_G(\lambda)$ and $T_G(\lambda)$ are a reflectance and a transmittance of glass, constant η is a measure of the percentage of light from the illuminator reflected from vehicle glass and received by the detector, $T_L^i(\lambda)$ is a transmittance of the $i^{th}$ filter, and $D(\lambda)$ is a responsivity of the detecting device. Any of the pixel intensity values can be combined to generate one or more new intensity values for this pixel and processed accordingly.

At step 504, a first pixel of the IR image is retrieved for processing. The first pixel may be selected automatically by a processor or be identified by a user using a graphical user interface such as, for instance, a keyboard, mouse, and monitor, associated with a computer workstation whereon various aspects of the present method are intended to be performed. The user may select a first region of the received IR image and some or all of the pixels within the selected area of the image processed ahead of other portions of the IR image. One or more IR images of the moving vehicle can be captured for processing in accordance herewith.

At step 506, the identified pixel is classified in accordance with either a best fitting reflectance or a correlation method. In the correlation method, intensity values estimated for a plurality of known materials are retrieved from a storage device or from a remote device over a network connection. A correlation coefficient is calculated between the pixel's intensity value and the retrieved intensity values. The pixel is then classified based upon an correlation computed between a pixel's intensity values and the intensity values for these known materials. In one embodiment, the correlation coefficient is given by:

$$c = \frac{\sum_{i=1}^{i=N}[[\Delta I_{cm}](i)][\Delta I_{cs}(i)]}{\sqrt{\left(\sum_{i=1}^{i=N}[\ldots]\Delta I_{cm}(i)\right)^2}\sqrt{\left(\sum_{i=1}^{i=N}[\ldots]\Delta I_{cs}(i)\right)^2}} \quad (3)$$

where $\Delta I_{cm}(i) = I_{cm}(i) - I_m$ is a measured intensity difference, $\Delta I_{cs}(i) = I_{cs}(i) - I_s$ is a calculated intensity difference, and $I_s$ is a calculated correspondence of $I_m$, such that, if the calculated intensity with a particular reflectance agrees with the object in the measured intensity, the correlation will be high (close to 1), otherwise the correlation will be small (close to 0 or negative).

In the best fitting reflectance method, reflectance values which have been estimated for a plurality of known materials are retrieved from a storage device or from a remote device over a network. Intensity values are calculated for these known materials using the retrieved reflectances. The current pixel's intensity values is then compared with the calculated intensity values for the known materials and the pixel is classified based upon a best fitting of the reflectance.

At step 508, once the current pixel has been classified, a determination is made whether any more pixels remain to be processed. If so then processing repeats with respect to step 504 wherein a next pixel is retrieved, selected, or otherwise identified for processing. Processing repeats until all desired pixels in the IR image have been processed.

At step 518 a total number of objects in the motor vehicle is then determined based upon the pixel classifications. Thereafter, further processing of the IR image, in this embodiment, ends.

Once pixels in the image can be separated from surrounding non-human objects, neural networks or fuzzy logic can be employed to facilitate a determination of the number of objects (living or non-living) in the vehicle. In one embodiment, this is achieved by spatially isolating identified humans in each of the one or more IR images taken by the imaging system of the target vehicle and counting the number of objects. If three IR cameras are employed such as, for instance, one facing the front of the moving vehicle to capture an image of the front passenger compartment, and one facing each side of the vehicle to capture an image of the passenger and driver's side of the vehicle, each of the images can be analyzed to determine objects present. In one example implementation, if the number of human occupants in the motor vehicle exceeds a predetermined number during the time of day where travel in a HOV lane is restricted, the license plate of the vehicle can be automatically captured using vehicle tag identification technology and a signal is sent to a traffic enforcement authority indicating that a vehicle with the identified license plate number is using the HOV lane without the required number of occupants.

It should be appreciated that the flow diagrams hereof are illustrative. One or more of the operative steps illustrated in any of the flow diagrams may be performed in a differing order. Other operations, for example, may be added, modified, enhanced, condensed, integrated, or consolidated with the steps thereof. Such variations are intended to fall within the scope of the appended claims. All or portions of the flow diagrams may be implemented partially or fully in hardware in conjunction with machine executable instructions.

Performance Results

A 4 band illuminator system was used. The LEDs used were with peak wavelength at 940 nm, 1070 nm, 1200 nm, and 1550 nm. The power spectra for the LEDs are shown in FIGS. 6-12. Near infrared (NIR) LEDs are already available in the market. These LEDs are made with various semiconductors such as GaAs or InGaAsP, and have peak wavelength starting from close to the visible (>730 nm) up to short wavelength infrared (>2000 nm). FIGS. 6-12 illustrate the spectrum of several infrared LEDs made from InGaAsP with peak wavelengths ranging between 810 nm to 1600 nm. These LEDs have good radiant power, between a few mW to about 45 mW for the high power ones. One can bundle together many LEDs with the same peak wavelength into a batch or a group. This study assumes each LED illuminator is equally powered (if not then the ratios in the following tables can be adjusted). The reflectance of various materials, including those of human skin, and the transmittance of the window are available in a wide array of published literature. The IR detection camera is commercially available and captures images from 900 nm to 1700 nm. Results using the correlation coefficients of Eq. (3) are presented in the tables of FIGS. 13 and 14. The term 'C123' means the correlation coefficient with the sequential illuminator only with band 1 (peak wavelength 940 nm), band 2 (1070 nm) and band 3 (1200 nm). Similar notations for other 3-band correlation coefficients. The term 'C4' stands for the correlation coefficient using all 4 bands. The table of FIG. 13 shows the correlation coefficients with $\eta=0$. From the table of FIG. 13, one can see that most of the three band combinations and the 4-band system works (negative correlation coefficients or small positive) except the 3-band combination 1, 2 and 3. The table of FIG. 14 shows the correlation coefficients with $\eta=0.05$. As one can see, the quality of separating skin with the other materials is reduced from the case with $\eta=0$. However, except for dirty glass and dark skin, the C234 combination and the 4-bands system are still reasonably good to separate skin from other materials. To further test the robustness hereof, we added 20% of white noise to the "measured" intensity and then tested the above correlation again. The results are shown in the table of FIG. 15. It is clear that for the C234 3-band and the 4-band camera system, the classification method is robust with this level of noise.

Example Block Diagram

Figure 16:
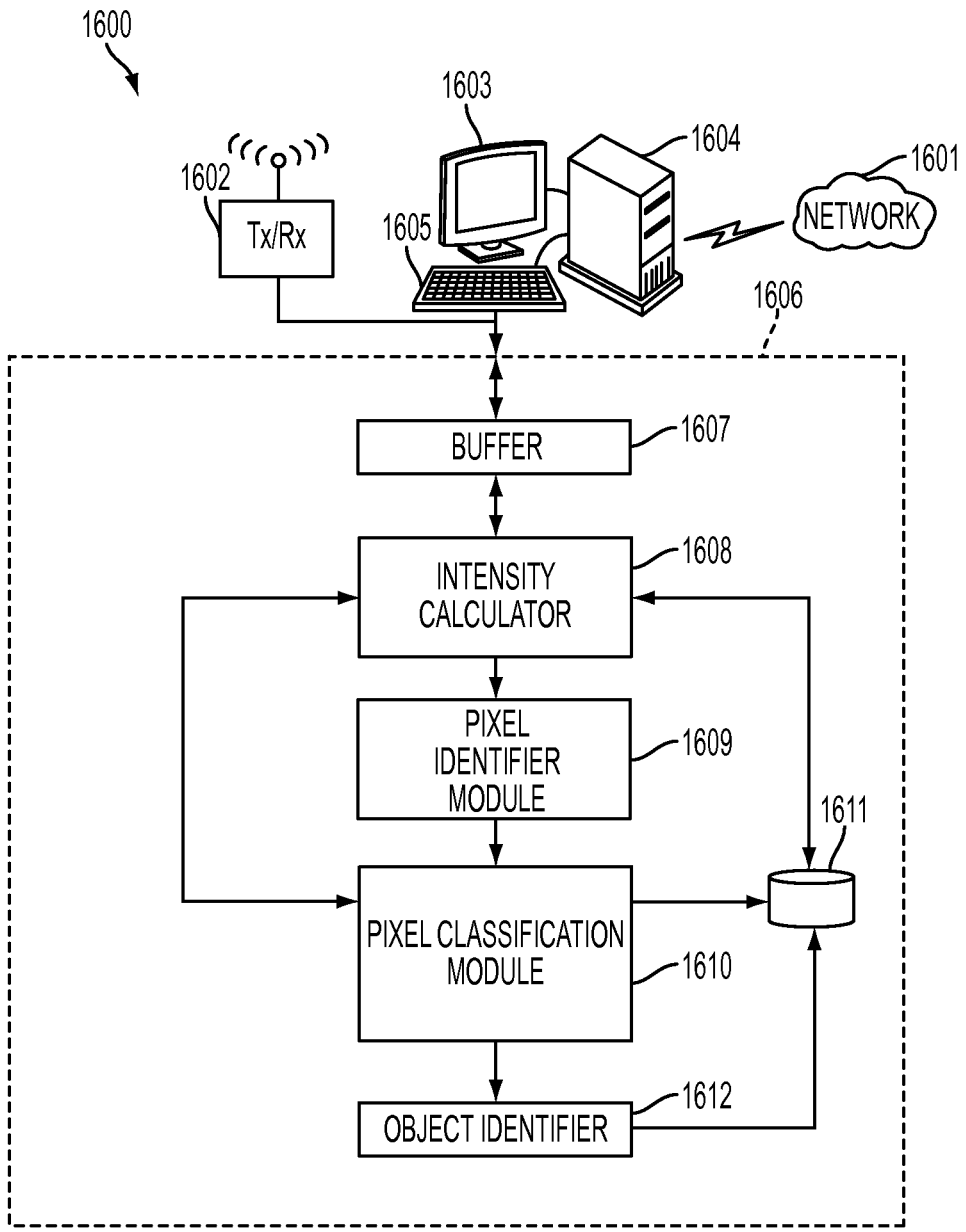
FIG. 16 illustrates a block diagram of one example system capable of implementing various aspects of the present method as shown and described with respect to the flow diagram of FIG. 5.

Reference is now being made to FIG. 16 which illustrates a block diagram of one example processing system capable of implementing various aspects of the present method shown and described with respect to the flow diagram of FIG. 5.

The embodiment of FIG. 16 is shown comprising a workstation 1604 in communication with IR image receiver 1602 for receiving pixel intensity values from antenna 408 of IR detection device 407 of FIG. 4 and for effectuating bi-directional communication between computer 1604 and detection device 408. Computer 1604 has a monitor 1603 and user interface 1605 for enabling a display of information for a user and for effectuating a user input or selection. Computer 1604 is also in communication with network 1601 via a network communications interface (not shown). Various portions of the captured IR image and/or pixel intensity values may be stored to a memory or storage device internal to workstation 1604 and may be communicated to a remote device over network 1601 for storage or further processing. A user may use the graphical user interface, e.g., keyboard and monitor, to identify or otherwise select pixels and/or areas of the IR image for processing or provide other user input required for the implementation hereof. Pixels and/or regions of interest identified or otherwise detected in the received IR image data may be retrieved from a remote device, such as an image processing system over network 1601. Desktop computer 1604 and receiver 1602 are in communication with Image Processor 1606.

Image Processor 1606 is shown comprising a Buffer 1607 for queuing information relating to the received IR image such as, for instance, regions of interest within the image, and the like, which have been selected or otherwise identified for pixel processing. Buffer 1607 may further store retrieved data and mathematical formulas and representations to process the pages and groups of pages in the above-described manner. Intensity Calculator 1608 receives from workstation 1604 data and information about the variables needed to perform the calculations required. Pixel Identifier Module 1609 identifies the current pixel to be processed, as described above with respect to step 504. Module 1609 is in communication with monitor 1603 to present thereon a display for the user to select which pixel in the displayed IR image is intended to be processed next. The user may select some or all of the displayed IR image for processing. In other embodiments, the image is processed automatically, and it should be understood that such embodiments are intended to fall within the scope of the appended claims. Pixel Classification Module 1610 is a processor with memory in communication with Intensity Module 1608 to obtain the pixel intensity values for the current pixel and generates, depending on the method implemented, either a correlation coefficient and threshold values therefrom or reflectance values and a best fitting reflectance and saves the results to storage device 1611. Based upon the method employed, the pixel is classified. Module 1608 further stores/retrieves values to/from storage device 1611 for retrieval by module 1610. Object Identification Module 1612 receives the classified pixel from module 1610 and identifies the pixel based upon the classification. The classification of this pixel is saved to storage device 1611.

Figure 17:
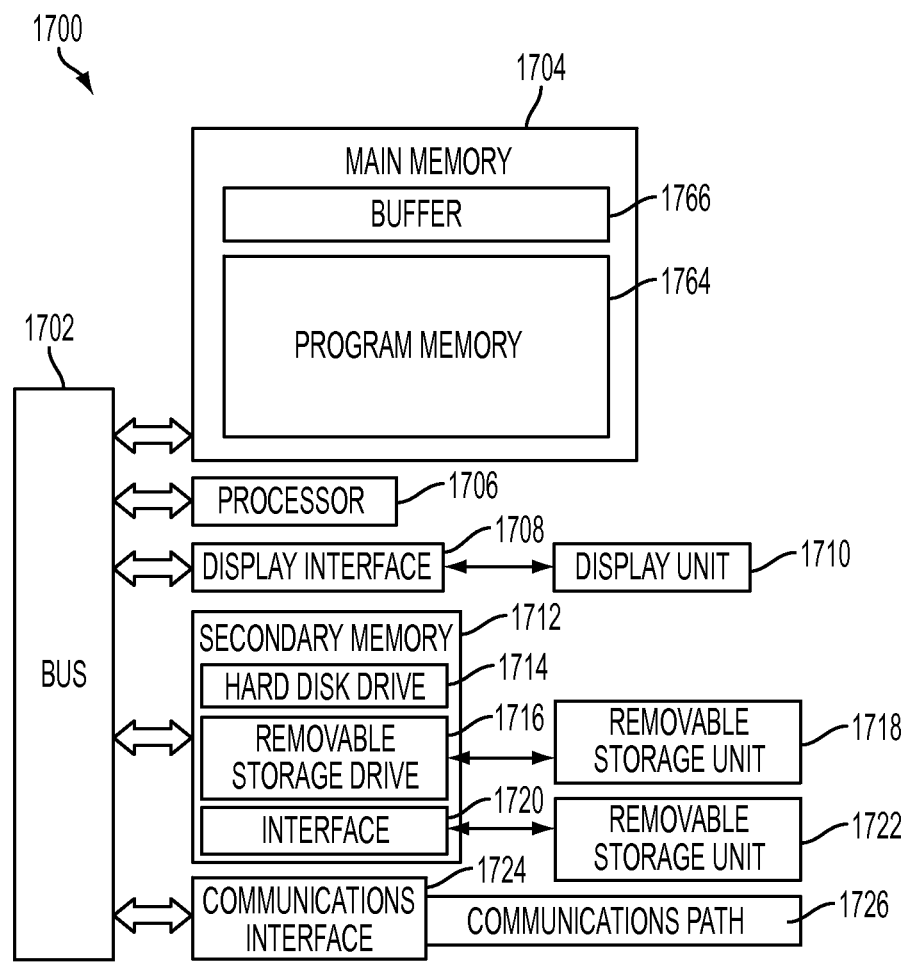
FIG. 17 illustrates a block diagram of one example embodiment of a special purpose computer system for performing one or more aspects of the present system and method as described with respect to the example flow diagram of FIG. 5 and the example functional block diagram of FIG. 16.

It should be understood that any of the modules and processing units of FIG. 16 are in communication with storage device 1611 via pathways shown or not shown and may store/retrieve data, parameter values, functions, pages, records, data, and machine readable/executable program instructions required to perform their intended functions. Each of these modules is also in communication with workstation 1604 via pathways (not shown) and may further be in communication with one or more remote devices over network 1601. It should be appreciated that some or all of the functionality for any of the modules may be performed, in whole or in part, by components internal to workstation 1604 or by a special purpose computer system as shown in FIG. 17. It should also be appreciated that various modules may designate one or more components which may, in turn, comprise software and/or hardware designed to perform the intended function. A plurality of modules may collectively perform a single function. Each module may have a specialized processor capable of executing machine readable program instructions. A module may comprise a single piece of hardware such as an ASIC, electronic circuit, or special purpose processor. A plurality of modules may be executed by either a single special purpose computer system or a plurality of special purpose computer systems in parallel. Connections between modules include both physical and logical connections. Modules may further include one or more software/hardware modules which may further comprise an operating system, drivers, device controllers, and other apparatuses some or all of which may be connected via a network. It is also contemplated that one or more aspects of the present method may be implemented on a dedicated computer system and may also be practiced in distributed computing environments where tasks are performed by remote devices that are linked through a network.

Example Special Purpose Computer

Reference is now being made to FIG. 17 which illustrates a block diagram of one example special purpose computer for implementing one or more aspects of the present method as described with respect to the flow diagram of FIG. 5, and the various modules and processing units of the block diagram of FIG. 16. Such a special purpose processor is capable of executing machine executable program instructions and may comprise any of a micro-processor, micro-controller, ASIC, electronic circuit, or any combination thereof.

Special purpose computer system 1700 includes processor 1706 for executing machine executable program instructions for carrying out all or some of the present method. The processor is in communication with bus 1702. The system includes main memory 1704 for storing machine readable instructions. Main memory may comprise random access memory (RAM) to support reprogramming and flexible data storage. Buffer 1766 stores data addressable by the processor. Program memory 1764 stores machine readable instructions for performing the present method. A display interface 1708 forwards data from bus 1702 to display 1710. Secondary memory 1712 includes a hard disk 1714 and storage device 1716 capable of reading/writing to removable storage unit 1718, such as a floppy disk, magnetic tape, optical disk, etc. Secondary memory 1712 may further include other mechanisms for allowing programs and/or machine executable instructions to be loaded onto the processor. Such mechanisms may include, for example, a storage unit 1722 adapted to exchange data through interface 1720 which enables the transfer of software and data. The system includes a communications interface 1724 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 1726 which carries such signals and may be implemented using wire, cable, fiber optic, phone line, cellular link, RF, memory, or other means known in the arts. The teachings hereof can be implemented in hardware or software using any known or later developed systems, structures, devices, and/or software by those skilled in the applicable art without undue experimentation from the functional description provided herein with a general knowledge of the relevant arts.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or image processing system embodying executable program instructions capable of performing the methodology described in the flow diagrams. Additionally, the article of manufacture may be included as part of a xerographic system, an operating system, a plug-in, or may be shipped, sold, leased, or otherwise provided separately, either alone or as part of an add-on, update, upgrade, or product suite.

It will be appreciated that various of the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art, which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for determining the number of objects in an IR image obtained by an IR imaging system, the method comprising:
    collecting a total of N intensity values for each pixel in an IR image said intensity values having been collected using an IR imaging system comprising a single IR detection device and a sequentially illuminating N band IR Illuminator, where (N≥3), with one fixed filter, said intensity values comprising:

$$I_c(i) = \alpha \int_{\lambda 1}^{\lambda 2} I_s^i(\lambda)[T_G^2(\lambda)R_o(\lambda) + \eta R_G(\lambda)]T_L(\lambda)D(\lambda)d\lambda + I_b$$

where i=1 ... N, such that i is the $i^{th}$ IR band from said illuminator that is sequentially illuminating, $\alpha$ is a constant that depends on an angle and distance from said illumination source, an attenuation of an IR wave in the air, and an integration time of said detecting device, $I_b$ is a background intensity, $R_o(\lambda)$ is a reflectance of an object detected by said detection device, $R_G(\lambda)$ and $T_G(\lambda)$ are a reflectance and a transmittance of glass, otherwise $R_G(\lambda)=0$ and $T_G(\lambda)=1$, constant $\eta$ is a percentage of light reflected from glass and received by said detector, otherwise $\eta=0$, $T_L(\lambda)$ is a transmittance of said fixed filter, and $D(\lambda)$ is a responsivity of said detection device;
    determining a classification for each pixel in said IR image using one of: a best fitting method of a reflectance, and a correlation method; and
    determining a total number of objects in said IR image based upon said pixel classification.

2. The method of claim 1, wherein said correlation method comprises:

$$c = \frac{\sum_{i=1}^{i=N} [\Delta I_{cm}](i)[\Delta I_{cs}(i)]}{\sqrt{\sum_{i=1}^{i=N} [\Delta I_{cm}(i)]^2} \sqrt{\sum_{i=1}^{i=N} [\Delta I_{cs}(i)]^2}},$$

where $\Delta I_{cm}(i) = I_{cm}(i) - I_m$ is a measured intensity difference, $\Delta I_{cs}(i) = I_{cs}(i) - I_s$ is a calculated intensity difference, and $I_s$ is a calculated correspondence of $I_m$, such that, if the calculated intensity with a particular reflectance agrees with the object in the measured intensity, the correlation will be high (close to 1), otherwise the correlation will be small (close to 0 or negative); and
    classifying said pixel based upon an amount of said correlation.

3. A method for determining the number of objects in an IR image obtained by an IR imaging system, the method comprising:
    collecting a total of N intensity values for each pixel in an IR image using an IR imaging system comprising N IR detection devices with N band pass filters where (N≥3), and a single IR Illuminator covering a wavelength range of said filters, said intensity values comprising:

$$I_c(i) = \alpha \int_{\lambda 1}^{\lambda 2} I_s(\lambda)[T_G^2(\lambda)R_o(\lambda) + \eta R_G(\lambda)]T_L^i(\lambda)D(\lambda)d\lambda + I_b$$

where i=1 ... N, such that i is the $i^{th}$ IR band pass filter, $\alpha$ is a constant that depends on an angle and distance from said illumination source, an attenuation of an IR wave in the air, and an integration time of said detecting device, $I_b$ is a background intensity, $R_o(\lambda)$ is a reflectance of an object detected by said detection device, $R_G(\lambda)$ and $T_G(\lambda)$ are a reflectance and a transmittance of glass, otherwise $R_G(\lambda)=0$ and $T_G(\lambda)=1$, constant $\eta$ is a percentage of light reflected from glass and received by said detector, otherwise $\eta=0$, $T_L^i(\lambda)$ is a transmittance of the $i^{th}$ filter, and $D(\lambda)$ is a responsivity of said detection device;
    determining a classification for each pixel in said IR image using one of: a best fitting method of a reflectance, and a correlation method; and
    determining a total number of objects in said IR image based upon said pixel classification.

4. The method of claim 1, wherein said best fitting reflectance method comprises:
    cross-referencing an intensity value associated with said pixels with at least one calculated intensity value using a known reflectance retrieved from a database; and
    classifying said pixel based upon a best fitting reflectance.

5. The method of claim 1, wherein said database further contains any of: a power spectra of said illuminator, a transmittance of a filter, a responsivity curve, and a quantum efficiency curve of a detector on said IR detection device.

6. The method of claim 1, further comprising combining any of said pixel intensity values to generate at least one new intensity value for said pixel.

7. A system for determining the number of objects in an IR image, the system comprising:
    a memory and a storage medium; and
    a processor in communication with and said storage medium and said memory, said processor executing machine readable instructions for performing the method of:
        collecting a total of N intensity values for each pixel in an IR image using an IR imaging system comprising a single IR detection device and a sequentially illuminating N band IR Illuminator, where (N≥3), with one fixed filter, said intensity values comprising:

$$I_c(i) = \alpha \int_{\lambda 1}^{\lambda 2} I_s^i(\lambda)[T_G^2(\lambda)R_o(\lambda) + \eta R_G(\lambda)]T_L(\lambda)D(\lambda)d\lambda + I_b$$

where i=1 ... N, such that i is the $i^{th}$ IR band from said illuminator that is sequentially illuminating, $\alpha$ is a constant that depends on an angle and distance from said illumination source, an attenuation of an IR wave in the air, and an integration time of said detecting device, $I_b$ is a background intensity, $R_o(\lambda)$ is a reflectance of an object detected by said detection device, $R_G(\lambda)$ and $T_G(\lambda)$ are a reflectance and a transmittance of glass, otherwise $R_G(\lambda)=0$ and $T_G(\lambda)=1$, constant $\eta$ is a percentage of light reflected from glass and received by said detector, otherwise $\eta=0$, $T_L(\lambda)$ is a transmittance of said fixed filter, and $D(\lambda)$ is a responsivity of said detection device;
    determining a classification for each pixel in said IR image using one of: a best fitting method of a reflectance, and a correlation method; and
    determining a total number of objects in said IR image based upon said pixel classification.

8. The system of claim 7, wherein said correlation method comprises:

$$c = \frac{\sum_{i=1}^{i=N}[\Delta I_{cm}](i)[\Delta I_{cs}(i)]}{\sqrt{\sum_{i=1}^{i=N}[\Delta I_{cm}(i)]^2}\sqrt{\sum_{i=1}^{i=N}[\Delta I_{cs}(i)]^2}}$$

where $\Delta I_{cm}(i)=I_{cm}(i)-I_m$ is a measured intensity difference, $\Delta I_{cs}(i)=I_{cs}(i)-I_s$ is a calculated intensity difference, and $I_s$ is a calculated correspondence of $I_m$, such that, if the calculated intensity with a particular reflectance agrees with the object in the measured intensity, the correlation will be high (close to 1), otherwise the correlation will be small (close to 0 or negative); and
    classifying said pixel based upon an amount of said correlation.

9. The system of claim 7, wherein said best fitting reflectance method comprises:
    cross-referencing an intensity value associated with said pixels with at least one calculated intensity value using a known reflectance retrieved from a database; and
    classifying said pixel based upon a best fitting reflectance.

10. The system of claim 7, wherein said database further contains any of: a power spectra of said illuminator, a transmittance of a filter, a responsivity curve, and a quantum efficiency curve of a detector on said IR detection device.

11. The system of claim 7, further comprising combining any of said pixel intensity values to generate at least one new intensity value for said pixel.

12. The system of claim 7, wherein said objects are human occupants in a motor vehicle.

13. The method of claim 3, wherein said correlation method comprises:

$$c = \frac{\sum_{i=1}^{i=N}[\Delta I_{cm}](i)[\Delta I_{cs}(i)]}{\sqrt{\sum_{i=1}^{i=N}[\Delta I_{cm}(i)]^2}\sqrt{\sum_{i=1}^{i=N}[\Delta I_{cs}(i)]^2}}$$

where $\Delta I_{cm}(i)=I_{cm}(i)-I_m$ is a measured intensity difference, $\Delta I_{cs}(i)=I_{cs}(i)-I_s$ is a calculated intensity difference, and $I_s$ is a calculated correspondence of $I_m$, such that, if the calculated intensity with a particular reflectance agrees with the object in the measured intensity, the correlation will be high (close to 1), otherwise the correlation will be small (close to 0 or negative); and
    classifying said pixel based upon an amount of said correlation.

14. The method of claim 1, wherein said objects are human occupants in a motor vehicle.

15. The method of claim 13, wherein said best fitting reflectance method comprises:
    cross-referencing an intensity value associated with said pixels with at least one calculated intensity value using a known reflectance retrieved from a database; and
    classifying said pixel based upon a best fitting reflectance.

16. The method of claim 13, wherein said database further contains any of: a power spectra of said illuminator, a transmittance of a filter, a responsivity curve, and a quantum efficiency curve of a detector on said IR detection device.

17. The method of claim 13, further comprising combining any of said pixel intensity values to generate at least one new intensity value for said pixel.

18. The method of claim 3, wherein said objects are human occupants in a motor vehicle.

19. A system for determining the number of objects in an IR image, the system comprising:
    a memory and a storage medium; and
    a processor in communication with and said storage medium and said memory, said processor executing machine readable instructions for performing the method of:
    collecting a total of N intensity values for each pixel in an IR image using an IR imaging system comprising N IR detection devices with N band pass filters where ($N\geq 3$), and a single IR Illuminator covering a wavelength range of said filters, said intensity values comprising:

$$I_c(i)=\alpha\int_{\lambda 1}^{\lambda 2}I_s(\lambda)[T_G^2(\lambda)R_o(\lambda)+\eta R_G(\lambda)]T_L^i(\lambda)D(\lambda)d\lambda+I_b$$

where $i=1\ldots N$, such that i is the $i^{th}$ IR band pass filter, $\alpha$ is a constant that depends on an angle and distance from said illumination source, an attenuation of an IR wave in the air, and an integration time of said detecting device, $I_b$ is a background intensity, $R_o(\lambda)$ is a reflectance of an object detected by said detection device, $R_G(\lambda)$ and $T_G(\lambda)$ are a reflectance and a transmittance of glass, otherwise $R_G(\lambda)=0$ and $T_G(\lambda)=1$, constant $\eta$ is a percentage of light reflected from glass and received by said detector, otherwise $\eta=0$, $T_L^i(\lambda)$ is a transmittance of the $i^{th}$ filter, and $D(\lambda)$ is a responsivity of said detection device;
    determining a classification for each pixel in said IR image using one of: a best fitting method of a reflectance, and a correlation method; and
    determining a total number of objects in said IR image based upon said pixel classification.

20. The system of claim 19, wherein said correlation method comprises:

$$c = \frac{\sum_{i=1}^{i=N}[\Delta I_{cm}](i)[\Delta I_{cs}(i)]}{\sqrt{\sum_{i=1}^{i=N}[\Delta I_{cm}(i)]^2}\sqrt{\sum_{i=1}^{i=N}[\Delta I_{cs}(i)]^2}}$$

where $\Delta I_{cm}(i)=I_{cm}(i)-I_m$ is a measured intensity difference, $\Delta I_{cs}(i)=I_{cs}(i)-I_s$ is a calculated intensity difference, and $I_s$ is a calculated correspondence of $I_m$, such that, if the calculated intensity with a particular reflectance agrees with the object in the measured intensity, the correlation will be high (close to 1), otherwise the correlation will be small (close to 0 or negative); and classifying said pixel based upon an amount of said correlation.

21. The system of claim 19, wherein said best fitting reflectance method comprises:
cross-referencing an intensity value associated with said pixels with at least one calculated intensity value using a known reflectance retrieved from a database; and
classifying said pixel based upon a best fitting reflectance.

22. The system of claim 19, wherein said database further contains any of: a power spectra of said illuminator, a transmittance of a filter, a responsivity curve, and a quantum efficiency curve of a detector on said IR detection device.

23. The system of claim 19, further comprising combining any of said pixel intensity values to generate at least one new intensity value for said pixel.

24. The system of claim 19, wherein said objects are human occupants in a motor vehicle.

* * * * *